(12) United States Patent
Fagan et al.

(10) Patent No.: US 12,111,912 B2
(45) Date of Patent: Oct. 8, 2024

(54) MALICIOUS DATABASE REQUEST IDENTIFICATION

(71) Applicant: British Telecommunications Public Limited Company, London (GB)

(72) Inventors: Paul Fagan, London (GB); Nigel Bell, London (GB)

(73) Assignee: British Telecommunications Public Limited Company (GB)

( * ) Notice: Subject to any disclaimer, the term of this patent is extended or adjusted under 35 U.S.C. 154(b) by 496 days.

(21) Appl. No.: 16/086,205

(22) PCT Filed: Mar. 3, 2017

(86) PCT No.: PCT/EP2017/055084
§ 371 (c)(1),
(2) Date: Sep. 18, 2018

(87) PCT Pub. No.: WO2017/167546
PCT Pub. Date: Oct. 5, 2017

(65) Prior Publication Data
US 2020/0302078 A1 Sep. 24, 2020

(30) Foreign Application Priority Data
Mar. 30, 2016 (EP) .................. 16162894

(51) Int. Cl.
*G06F 21/62* (2013.01)
*G06F 16/245* (2019.01)
(Continued)

(52) U.S. Cl.
CPC ............ *G06F 21/50* (2013.01); *G06F 16/245* (2019.01); *G06F 18/22* (2023.01); *G06F 21/566* (2013.01); *G06F 21/6227* (2013.01)

(58) Field of Classification Search
CPC .... G06F 21/6227; G06F 16/245; G06F 21/62; G06F 21/6218; G06F 21/566; G06K 9/6215
See application file for complete search history.

(56) References Cited

U.S. PATENT DOCUMENTS 8,046,374 B1 10/2011 Bromwich
2003/0037251 A1* 2/2003 Frieder ............... G06F 21/6227
726/23
(Continued)

FOREIGN PATENT DOCUMENTS

EP 2521049 A1 11/2012
WO WO 2017/167543 A1 10/2017

OTHER PUBLICATIONS

Communication Pursuant to Article 94(3) EPC for Application No. 17708273.2, mailed on May 11, 2020, 5 pages.
(Continued)

*Primary Examiner* — Daniel B Potratz
(74) *Attorney, Agent, or Firm* — Pranger Law PC

(57) ABSTRACT

A computer implemented method to identify a malicious database request including receiving a database query for retrieving data from a database; classifying the received query based on query instructions contained in the query to identify a class of query for the query, the class of query having associated attributes defining expected characteristics of queries of the class when executed by the database; monitoring characteristics of the received query executed to retrieve data from the database; and responsive to a determination that the monitored characteristics deviate from the expected characteristics, identifying the query as malicious.

6 Claims, 2 Drawing Sheets

(51) Int. Cl.
  *G06F 18/22* (2023.01)
  *G06F 21/50* (2013.01)
  *G06F 21/56* (2013.01)

(56) References Cited

U.S. PATENT DOCUMENTS

| | | | |
|---|---|---|---|
| 2003/0174648 | A1 | 9/2003 | Wang et al. |
| 2005/0203921 | A1 | 9/2005 | Newman et al. |
| 2006/0212438 | A1 | 9/2006 | Ng |
| 2007/0016685 | A1 | 1/2007 | Crume |
| 2007/0156666 | A1 | 7/2007 | Vanriper et al. |
| 2010/0023503 | A1 | 1/2010 | Baris et al. |
| 2011/0271146 | A1 | 11/2011 | Mork et al. |
| 2014/0201838 | A1 | 7/2014 | Varsanyi et al. |
| 2014/0337276 | A1 | 11/2014 | Iordanov |
| 2015/0019584 | A1 | 1/2015 | Berg et al. |
| 2015/0172319 | A1* | 6/2015 | Rodniansky ........ G06F 21/6227 726/1 |
| 2016/0337400 | A1* | 11/2016 | Gupta ................. H04L 63/1416 |
| 2017/0083703 | A1* | 3/2017 | Abbasi ................. G06F 21/561 |
| 2017/0140027 | A1* | 5/2017 | Suleman ............... G06F 16/245 |

OTHER PUBLICATIONS

Communication pursuant to Article 94(3) EPC for Application No. 17710163.1, mailed on Apr. 3, 2020, 7 pages.
Criscione., et al., "Integrated Detection of Attacks Against Browsers, Web Applications and Databases," 2009 European Conference on Computer Network Defense, pp. 37-45.
Extended European Search Report for Application No. 16162894.6, mailed on Aug. 5, 2016, 7 pages.
Extended European Search Report for European Application No. 16162909.2, mailed on Sep. 22, 2016, 18 pages.
Sellami R., et al., "ODBAPI: A Unified REST API for Relational and NoSQL Data Stores," 2014, IEEE International Congress on Big Data, 8 pages.
Application as filed for U.S. Appl. No. 16/086,186, filed Sep. 18, 2018, Inventor(s): Healing et al.
International Preliminary Report on Patentability for corresponding PCT Application No. PCT/EP2017/055084, issued Oct. 2, 2018, 5 pages.
International Search Report and Written Opinion for corresponding PCT Application No. PCT/EP2017/055084, mailed Mar. 29, 2017, 7 pages.
International Preliminary Report on Patentability for corresponding PCT Application No. PCTEP2017/055080, issued Oct. 2, 2018, 12 pages.
International Search Report and Written Opinion for corresponding PCT Application No. PCTEP2017/055080, mailed Apr. 4, 2017, 16 pages.
Wen-Syan Li et al., "Load and Network Aware Query Routing for Information Integration", Data Engineering, 2005. ICDE 2005. Proceedings. 21$^{st}$ International Con Ference on Tokyo, Japan Apr. 5-8, 2005, Piscataway, NJ, USA, IEEE, Apr. 5, 2005 (Apr. 5, 2005), pp. 927-938, XP010788240.
Josifovski V et al., "Garlic: A New Flavor of Federal Query Processing for DB2", Proceedings of the ACM Sigmod International Conference on Management of Data: Jun. 3-6, 2005, Madison Association for Computing Machinery, New York, NY, US, Jun. 4, 2002 (Jun. 4, 2002), pp. 524-532, XP002390477.
Stonebraker, Mike et al., "C-Store: A Column-oriented DBMS", Proceedings of the 31st VLDB Conference, Sep. 2, 2005 (Sep. 2, 2005), pp. 553-564, XP055298338.
Lamb, Andrew et al., "The Vertica Analytic Database: CStore 7 Years Later", Proceedings of the VLDB Endowment, vol. 5, No. 12, Aug. 31, 2012 (Aug. 31, 2012), pp. 1790-1801, XP055293327.
Chawathe Sudarshan et al., "The TSIMMIS Project: Integration of Heterogeneous Information Sources", Proceedings of IPSJ Conference, Oct. 13, 1994 (Oct. 13, 1994), pp. 7-18, XP055298321.
Tomasic Anthony et al., "Scaling access to heterogeneous data sources with Disco" IEEE Transactions on Knowledge and Data Engineering, vol. 10, No. 5, Oct. 1, 1998 (Oct. 1, 1998), pp. 808-823, XP055298330.
Stonebraker, Michael et al., "Mariposa: a wide-area distributed database system", VLDB Journal, vol. 5, No. 1, Jan. 1, 1996 (Jan. 1, 1996), pp. 48-63, XP055298327.
Stonebraker, Michael et al., "Mariposa: a new architecture for distributed data", Proceedings of 1994 IEEE 10th International Conference on Data Engineering, Feb. 14, 1994 (Feb. 14, 1994), pp. 54-65, XP055114946.
Ford, Neal, "Polyglot Programming", Dec. 5, 2006 memeagora.blogspot.co.uk/2006/12/polyglot-programming.html, 6 pages.
Fowler, Martin, "PolyglotPersistence", Nov. 17, 2011, martinfowler.com/bliki/PolyglotPersistence.html, 4 pages.
Leberknight, Scott, "Polyglot Persistence", Oct. 15, 2008, www.sleberknight.com/blog/sleberkn/entry/polyglot_persistence, 2 pages.
Mallette S., "Polyglot Persistence and Query with Gremlin", Feb. 4, 2013, thinkaurelius.com/2013/02/04/polyglot-persistence-and-query-with-gremlin, 9 pages.
McHenry, Kenton et al., "A Mosaic of Software", 2011 Seventh IEEE International Conference on eScience, 8 pages.
Gremlin, "Apache TinkerPop Website", Feb. 8, 2016, http://tinkerpop.incubator.apache.org, 3 pages.
Sadalage, Pramodkumar J. et al., "NoSQL: A Brief Guide to the Emerging World of Polyglot Persistence Distilled", Addison-Wesley, ISBN 978-0-321-82662-6, Sep. 2013, 304 pages.
Castrejón, Juan et al., "ExSchema: Discovering and Maintaining Schemas from Polyglot Persistence Applications" 2013 IEEE International Conference on Software Maintenance, 4 pages.
Seelam, Seetharami R. et al., "Polyglot Application Auto Scaling Service for Platform as a Service Cloud" 2015 IEEE International Conference on Cloud Engineering, 8 pages.
Abhishek Tiwari, "Polyglot Persistence Patterns", http://abhishektiwari.com, Aug. 30, 2012, 6 pages.

* cited by examiner

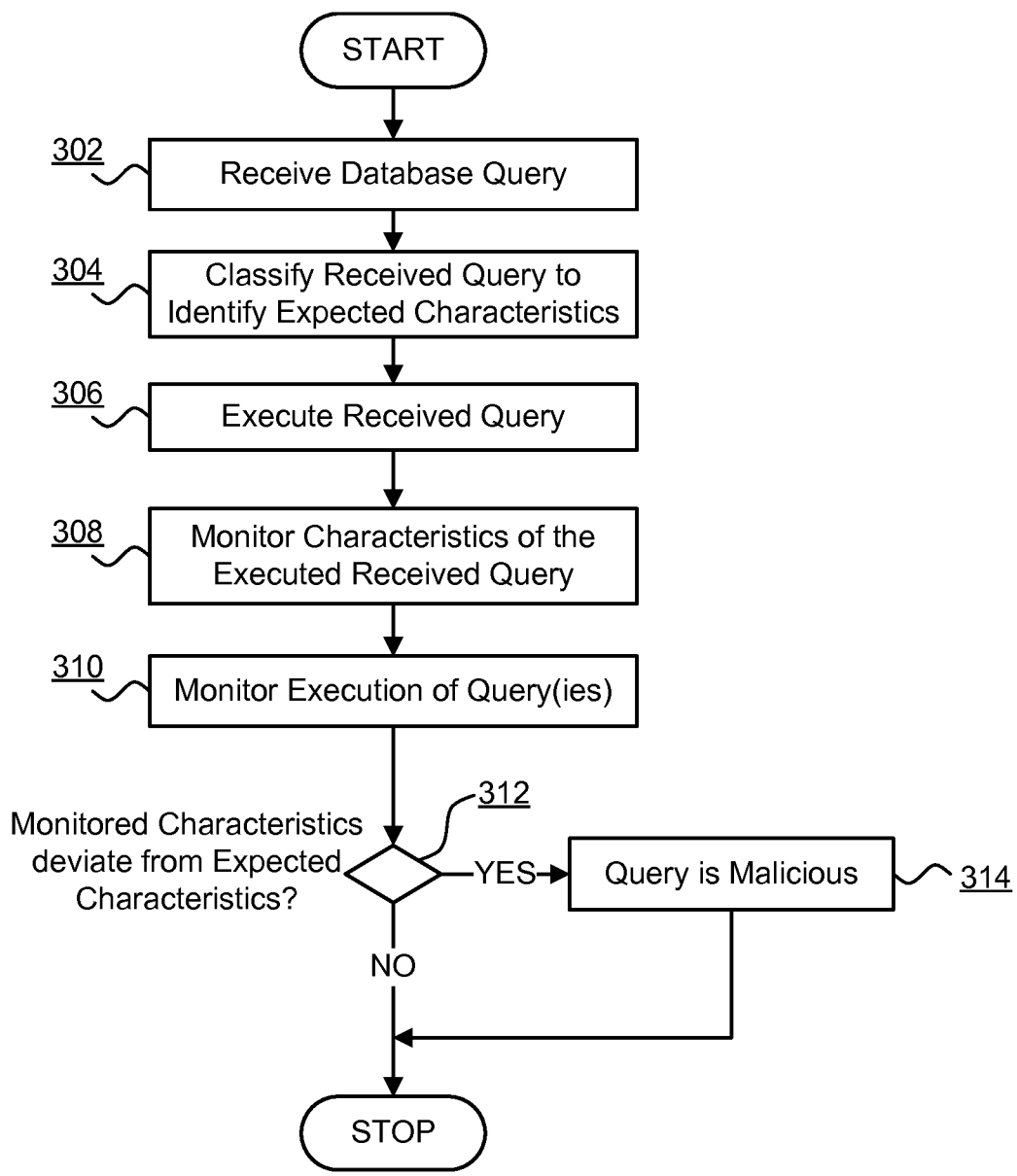

MALICIOUS DATABASE REQUEST IDENTIFICATION

CROSS-REFERENCE TO RELATED APPLICATION

The present application is a National Phase entry of PCT Application No. PCT/EP2017/055084, filed Mar. 3, 2017, which claims priority from EP Patent Application No. 16162894.6, filed Mar. 30, 2016 each of which is hereby fully incorporated herein by reference.

TECHNICAL FIELD

The present disclosure relates to the identification of malicious database requests. In particular it relates to identifying malicious database queries.

BACKGROUND

Computing software and services can require the storage of data in a structured data store to provide data and/or state persistence such that data and/or state have potential to outlive processes creating, accessing and/or processing it. Such structured data stores can be constituted as separate software or services implemented in potentially multiple different ways and storing data in potentially multiple different arrangements including: different data structures; different data formats; different data storage and/or retrieval mechanisms; different data indexing methodologies; different data referencing mechanisms; different techniques to represent, codify, store or otherwise record interrelationships between data stores and items or collections of data stored therein; and other difference mechanisms or manners of data and/or state persistence. These differences arise as data storage arrangements develop to address requirements of software applications. Examples of different and potentially disparate arrangements of data storage include, inter alia, Amazon SimpleDB, Google Bigtable, Microsoft SQL Server Data Services (SSDS) and CouchDB.

Data storage services such as databases provide an interface through which queries of the data contained in the data store can be undertaken to generate a result-set of zero or more data items. Such queries can be structured differently for different data stores. For example, relational databases can employ a structured query language (SQL) which may be standardized so providing some abstraction between applications and database providers.

One challenge in the deployment of data stores is protection against malicious access to the data store. This challenge is particularly acute where the data store is available to a wide range of applications and users such as data stores accessible via the internet, world wide web, public databases and the like. In such contexts malicious applications and/or users can consume the resources of the data store to such an extent that the availability, responsiveness, efficiency or other characteristics of the data store for other users and/or applications is affected. For example, malicious access to a data store that results in occupying the data store for a prolonged period of time can effectively render the data store inaccessible, unresponsive or less responsive for other applications accessing the data store. Such malicious interaction with a data store can be considered a type of denial-of-service (or reduction of service) attack in which the service provided by the data store is reduced or denied as a result of the malicious access. Such malicious access can include, for example, requesting that a database execute a query involving a very large number of data items from the database that will take a correspondingly longer period of time to execute and fulfil relative to other queries. Similarly, queries that involve repetitious or circular references, cross-references, indexing and the like. Furthermore, a large number of queries submitted in a short space of time could result in denial-of-service (or reduction of service) characteristics.

SUMMARY

Thus there is a need to address the potential for applications, clients and users to reduce or deny service provided by a database.

The present disclosure accordingly provides, in a first aspect, a computer implemented method to identify a malicious database request comprising: receiving a database query for retrieving data from a database; classifying the received query based on query instructions contained in the query to identify a class of query for the query, the class of query having associated attributes defining expected characteristics of queries of the class when executed by the database; monitoring characteristics of the received query executed to retrieve data from the database; and responsive to a determination that the monitored characteristics deviate from the expected characteristics, identifying the query as malicious.

In some embodiments the class of query has associated a class query including the query instructions of the received query and the expected characteristics are defined based on the execution of the class query.

In some embodiments the query is received from a software application and responsive to the determination the application is identified as a malicious application.

In some embodiments the method further comprises rejecting subsequent queries received from the identified malicious application.

In some embodiments the method further comprises rejecting subsequent queries belonging to the same class as the received query and having attributes determined to be similar to attributes of the received query based on predetermined threshold degree of similarity of attributes.

The present disclosure accordingly provides, in a second aspect, a computer system including a processor and memory storing computer program code for performing the method described above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flowchart of a method of the proxy of FIG. 2 in accordance with an embodiment of the present disclosure.

DETAILED DESCRIPTION

Figure 1:
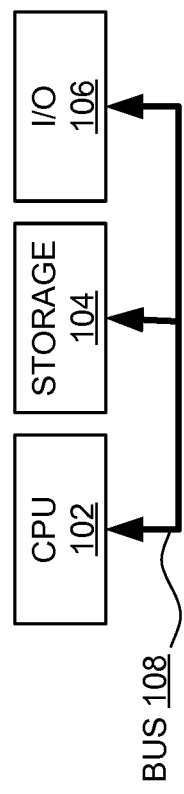
FIG. 1 is a block diagram of a computer system suitable for the operation of embodiments of the present disclosure.

FIG. 1 is a block diagram of a computer system suitable for the operation of embodiments of the present disclosure.

A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
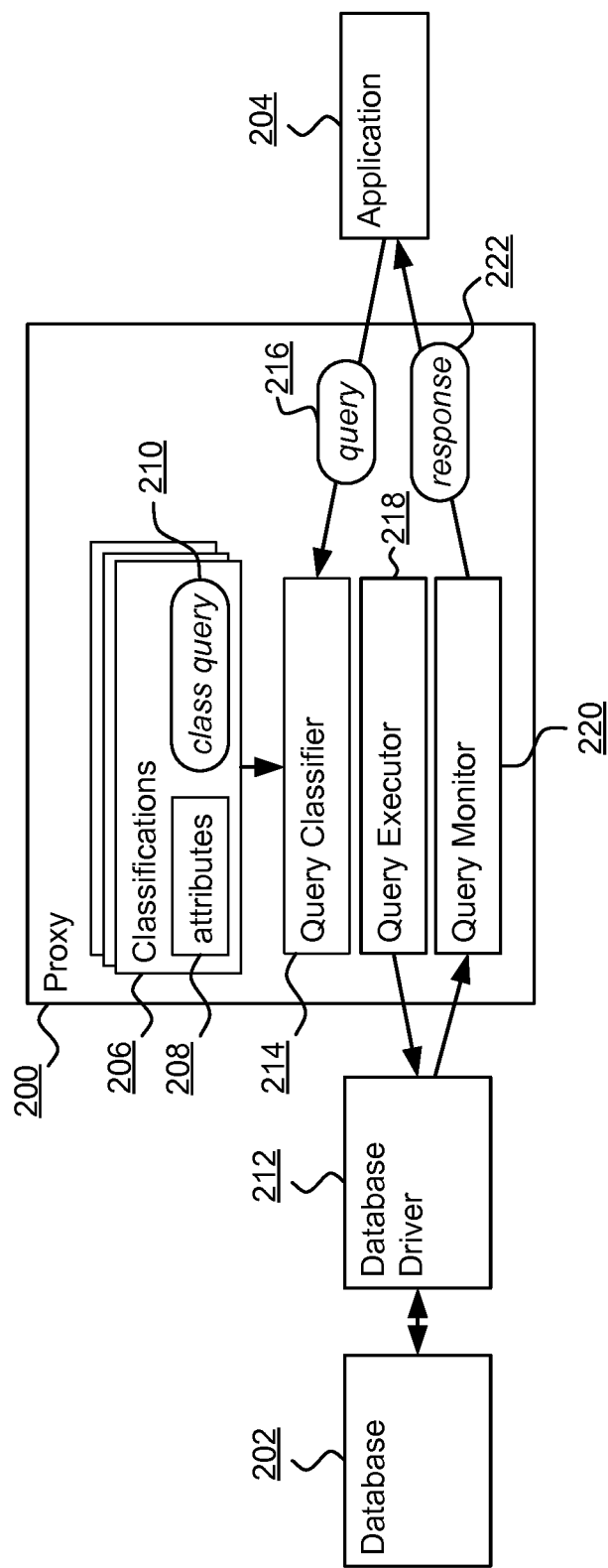
FIG. 2 is a component diagram of a database driver proxy for identifying a malicious database request in accordance with an embodiment of the present disclosure.

FIG. 2 is a component diagram of a database driver proxy 200 for identifying a malicious database request in accordance with an embodiment of the present disclosure. The database driver proxy 200 is a software, hardware or firmware component adapted to receive database queries from one or more applications such as software application 204. Such queries are intended for a database 202 such as a relational database. For example, the queries can be SQL queries. The proxy 200 appears to the application 204 as a database driver for accessing a database 202. According to the arrangement of FIG. 2 the proxy 200 sits between the application 204 and the database driver 212. The database driver 212 is a software, hardware, firmware or combination component for enabling applications such as application 204 to work with, access and interact with the database 202. For example, the database driver can be a Java Database Connectivity (JDBC) Application Programming Interface (API).

The proxy includes a set of one or more query classifications 206 as classifiers for database queries. Each query classification 206 relates to a type of query having particular instructions. For example, a query of the form:

SELECT DISTINCT col1, col2, FROM table1, WHERE table1.col3=X can be characterized by the particular query instructions with the variable X such that, while the value of X might change between queries, queries having instructions consistent with the above form can be classified together. Any number of different query classifications 206 can be adopted with new classifications being added by an operator or learned from queries received from applications such as application 204.

A query classification 206 preferably includes a class query 210 as a database query having instructions corresponding to queries in the class of queries with placeholder or multiple values for variable elements of the class query 210 (such as the variable 'X' in the example query above). Thus for each classification 206 the class query 210 can be executed by the database 202 via the driver 212 to identify attributes 208 for the classification 206. The attributes serve to define expected characteristics of queries of the classification 206 when executed by the database 202.

Characteristics determined for a classification 206 by executing a class query 210 can include: an expected range of a number of data items, rows or records retrieved by queries of a class; an expected range of a number of data items, rows or records affected by queries of a class, such as by being modified, referenced or the like; and an execution time for queries of a class. Thus the classification 206 permits an identification of queries for execution by the database 202 via the driver 212 that are consistent with or deviate from expected characteristics defined by the class attributes 208.

The attributes 208 for a classification 206 can include value ranges for attributes such as a number of data items returned or a number of rows updated. For example, value ranges could be chosen from the following categories: zero; one; zero to one; zero to one hundred; one to any number (i.e. non-zero); or any number. Other categories of value or ranges of value could alternatively be employed. Similarly, the execution time for a classification 206 can be a range of durations or orders of magnitude of duration.

The proxy 200 further includes a query classifier 214 as a hardware, software, firmware or combination component for classifying a query 216 received from an application 204 into one of the classifications 206. The classifier 214 can achieve such classification by comparing query instructions of the received query 216 with query instructions of the class query 210 to identify similarity or, preferably, identity (save for variables that will differ). In some embodiments, where a received query 216 cannot be readily classified a closest matching classification 206 can be used or a classification 206 having a class query 210 exhibiting a degree of similarity to a received query 216 exceeding a predetermined threshold can be used. In some embodiments, where a received query 216 cannot be readily classified a new classification can be generated for the received query 216 including defining a new class query based on the instructions for the received query 216 and determining appropriate attributes for the new classification.

The proxy further includes a query executor 218 as a hardware, software, firmware or combination component adapted to execute a received query 216 via the database driver 212. In one embodiment the query executor 218 or the driver 212 maintains a query queue in order to manage the execution of queries received from applications. Thus a query for execution can be added to the query queue. Where a query queue is employed, information relating to an identified classification 206 of the received query 216 can be stored in association with the query in the queue, such as by use of metadata or other associated data indicating or identifying the attributes for the class 206 to identify or indicate the expected characteristics for the query.

During and subsequent to the execution of the received query by the database 202 via the driver 212 a query monitor 220 as a hardware, software, firmware or combination component monitors characteristics of the query execution for comparison with the expected characteristics defined by way of the attributes 208 of the query classification 206. The query monitor 220 is thus adapted to determine if the monitored characteristics for the execution of the received query 216 deviate from the expected characteristics. Where such deviation is detected the received query 216 can be identified as malicious or potentially malicious and such identification can be flagged or communicated. In some embodiments remediation or protection measures can be adopted in response to such identification.

Where the query monitor 220 does not identify actual or potential malicious received query 216 then a response to the query 222 can be delivered to the application 204. Thus the query monitor 220 is adapted to monitor the execution of the received query 216 such as by analyzing one or more of: the response/result of the query 216 as a number of data items, records or rows; a number of data items affected by the query 216; a duration of execution of the query 216 and the like. The identification of deviation by the monitor 220 can be informed by predetermined thresholds or extents such that an extent of deviation that exceeds or meets a particular threshold or extent is determined to constitute a deviation that warrants a reaction. Such reaction can include not providing the response 222 to the application 204 and other remediation or protective measures as will be apparent to those skilled in the art.

Examples of remediation or protective measures in response to a determination of deviation from expected characteristics include: identifying the application 204 as potentially or actually malicious; rejecting subsequent queries received from the identified malicious application 204; rejecting subsequent queries belonging to the same class as the received query 216 and having attributes determined to be similar to attributes of the received query 216 based on a predetermined threshold degree of similarity of attributes; disconnecting the application 204; and other such measures as will be apparent to those skilled in the art.

In some embodiments the proxy 200 additionally classifies applications from which requests are received such as application 204 based on characteristics of the applications and/or queries received from the applications so as to identify applications having a similar profile. Such characteristics can include: a frequency and/or volume of queries; particular characteristics of the queries themselves such as the classes of queries received from applications; particular characteristics of responses sent to the applications such that applications issuing queries to which responses are of similar size (e.g. in terms of number of data items, records or the like) or of similar duration of execution are classified together; etc. Thus embodiments of the present disclosure provide for the identification of malicious queries and/or applications for databases.

FIG. 3 is a flowchart of a method of the proxy of FIG. 2 in accordance with an embodiment of the present disclosure. Initially, at 302, the method receives a database query 216 from an application 204. At 304 the received query 216 is classified according to query classifications 206 to identify attributes 208 defining expected characteristics of the received query 216. At 306 the received query 216 is executed by the database 202 via the driver 212. At 30 the monitor 220 monitors characteristics of the execution of the query 216. At 312, if the monitor identifies that the monitored characteristics of the execution of the query 216 deviate from the expected characteristics the method proceeds to 314 where the query 216 is identified as malicious.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to identify, by a database driver proxy including computing hardware of at least one processor and memory operably coupled to the at least one processor, a malicious database request originating from a software application, the database driver proxy communicatively coupled between the software application and a target database of the malicious database request, the method comprising:
 the database driver proxy receiving a query from the software application for retrieving data from the target database;
 before execution of the query, the database driver proxy classifying the query based on instructions contained in the query to identify a class of query for the query, the class of query having associated attributes defining expected characteristics of queries of the class when the query is executed by the target database;
 the database driver proxy monitoring characteristics of the query execution when the query is executed by the target database;
 the database driver proxy determining that the monitored characteristics deviate from the expected characteristics by an extent equal to or exceeding a predetermined threshold and identifying the query as malicious; and
 the database driver proxy implementing at least one protective measure in response to the identifying, wherein the at least one protective measure includes rejecting subsequent queries belonging to a same class as the query and having attributes determined to be similar to attributes of the query based on a predetermined threshold degree of similarity of attributes.

2. The method of claim 1, wherein the class of query further comprises a class query including the instructions of the query and the expected characteristics are defined based on execution of the class query.

3. The method of claim 1, wherein, responsive to the determining, the software application is identified as a malicious application.

4. The method of claim 3, wherein the at least one protective measure includes rejecting subsequent queries received from the identified malicious application.

5. A computer system comprising:
 a processor and memory storing computer program code such that the processor and memory are configured to operate as a database driver proxy communicatively coupled between a software application and a target database of a malicious database request to identify the malicious database request originating from the software application by:
 receiving a query from the software application for retrieving data from the target database, classifying the query prior to execution of the query based on instructions contained in the query to identify a class of query for the query, the class of query having associated attributes defining expected characteristics of queries of the class when executed by the target database, monitoring characteristics of execution of the query by the target database, determining that the monitored characteristics deviate from the expected characteristics by an extent equal to or exceeding a predetermined threshold and identifying the query as malicious, and implementing at least one protective measure, wherein the at least one protective measure includes rejecting subsequent queries belonging to a same class as the query and having attributes determined to be similar to attributes of the query based on a predetermined threshold degree of similarity of attributes.

6. A non-transitory computer readable storage medium storing a computer program element comprising computer program code to, when loaded into a computer system and executed thereon, cause the computer to perform the method as claimed in claim 1.

\* \* \* \* \*